(12) United States Patent
Del Sordo et al.

(10) Patent No.: US 11,830,500 B2
(45) Date of Patent: Nov. 28, 2023

(54) SYSTEM AND METHOD FOR DIGITAL ASSISTANT MANAGEMENT

(71) Applicant: ARRIS ENTERPRISES LLC, Suwannee, GA (US)

(72) Inventors: Christopher S. Del Sordo, Souderton, PA (US); Charles R. Hardt, Lawrenceville, GA (US); Albert Fitzgerald Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 63 days.

(21) Appl. No.: 17/217,899

(22) Filed: Mar. 30, 2021

(65) Prior Publication Data

US 2021/0312929 A1 Oct. 7, 2021

Related U.S. Application Data

(60) Provisional application No. 63/003,626, filed on Apr. 1, 2020.

(51) Int. Cl.
*G10L 15/32* (2013.01)
*G10L 15/22* (2006.01)
*G10L 15/30* (2013.01)
*G06F 9/451* (2018.01)
(Continued)

(52) U.S. Cl.
CPC ............ *G10L 15/32* (2013.01); *G06F 9/453* (2018.02); *G06F 16/245* (2019.01); *G10L 15/08* (2013.01); *G10L 15/22* (2013.01); *G10L 15/30* (2013.01); *G10L 2015/088* (2013.01); *G10L 2015/223* (2013.01)

(58) Field of Classification Search
CPC ... G06F 3/167; G10L 15/22; G10L 2015/223; G10L 15/1822; G10L 15/30; G10L 15/18; G10L 15/26; G10L 15/183
See application file for complete search history.

(56) References Cited

U.S. PATENT DOCUMENTS

2014/0272821 A1* 9/2014 Pitschel ................. G09B 19/06
434/157
2018/0336905 A1* 11/2018 Kim ........................ G10L 17/22
2018/0373398 A1* 12/2018 Seixeiro ................ H04M 1/724
(Continued)

*Primary Examiner* — Mark Villena
(74) *Attorney, Agent, or Firm* — Panitch Schwarze Belisario & Nadel LLC

(57) ABSTRACT

A system and method for the management of multiple digital assistants enabling the collection and analysis of voice commands and the selective instruction of the digital assistant having the most appropriate capability and/or connectivity to respond to the analyzed voice command. In a preferred embodiment the digital assistants are networked via a DAC. The controller serves to as a central node programmed to recognize the voice commands received by networked digital assistants and determine which assistant or assistants are best qualified to respond. This determination is a function of the command type, as well as the location and capabilities of each digital assistant. In addition, the system and method enhance the utility of the digital assistants, enabling a voice command received by a particular digital assistant to be acted upon by one or more digital assistants located outside of the audible range of the spoken voice command.

23 Claims, 6 Drawing Sheets

(51) Int. Cl.
　　　*G06F 16/245*　　　(2019.01)
　　　*G10L 15/08*　　　(2006.01)

(56) References Cited

U.S. PATENT DOCUMENTS

| | | | |
|---|---|---|---|
| 2019/0205386 A1* | 7/2019 | Kumar | G06F 40/30 |
| 2020/0311011 A1* | 10/2020 | Kim | G06F 13/385 |
| 2021/0200598 A1* | 7/2021 | Barczyk | G06F 9/505 |
| 2021/0217415 A1* | 7/2021 | Nallaperumal | G06F 40/30 |

* cited by examiner

SYSTEM AND METHOD FOR DIGITAL ASSISTANT MANAGEMENT

CROSS-REFERENCE TO RELATED APPLICATION

This application claims the benefit of U.S. Provisional Patent Application No. 63/003,626, filed Apr. 1, 2020, which is incorporated by reference herein in its entirety.

BACKGROUND OF THE INVENTION

Since the release of the Amazon Echo in 2014 and the Google Assistant in 2016, the consumer market has seen an ever-increasing proliferation of voice-responsive digital assistants. These assistants have become almost ubiquitous in both home and workplace environments, as both stand-alone appliances and as integral systems within other products, such as televisions, household appliances, thermostats, audio systems and automobiles. It is not uncommon for a work or home environment to contain numerous digital assistants, each of which is a separate system continuously "listening" for voice commands. These separate digital assistants could each be operating on completely different software and have identical, overlapping, or entirely disparate capabilities and connectivity. In addition, given the open architecture of most home and work environments, a single voice command issued therein would have a high probability of being received by more than one digital assistant.

The simultaneous reception of the same voice command by multiple digital assistants could result in the command being responded to more than one digital assistant, or to the command being acted on by an inappropriate (and possibly ill-equipped) digital assistant. Typically, digital assistants are programmed to react only to a particular activation phrase ("Alexa", "Hey, Google", etc.) so as to minimize the chance for normal conversation to be mistakenly interpreted as a command. However, if multiple digital assistants programmed to respond to like activation phrases are located within the same environment, command confusion would be a definite concern causing multiple or unintended assistants to respond. In addition, requiring a user to remember the proper activation phrase to use for a particular task or in a particular location within the home/office environment introduces an unwanted layer of complexity into a voice-responsive system intended to provide users with an easy to use interface.

There is a need for a means of receiving, analyzing and directing voice commands within a given environment serviced by two or more digital assistants, and directing such commands to the particular digital assistant best suited to provide the proper response or initiate the requested action.

In many cases, there may be a digital assistant on the consumer premises that is out of voice range that may be more suited to carry out a particular command, in those cases it would be useful for an in-voice range digital assistant to interface with the consumer and serve as a proxy to out of range digital assistant to carry out the command.

BRIEF SUMMARY OF THE INVENTION

A system and method for the management of multiple digital assistants enabling the collection and analysis of voice commands and the selective instruction of the digital assistant having the most appropriate capability and/or connectivity to respond to the analyzed voice command. In a preferred embodiment the digital assistants are networked via a digital assistant controller ("DAC"). The controller serves to as a central node located either in the cloud server or in local device) programmed to recognize the voice commands received by networked digital assistants and determine which assistant or assistants are best qualified to respond. This determination is a function of the command type, as well as the location and capabilities of each digital assistant. In addition, the system and method enhance the utility of the digital assistants, enabling a voice command received by a particular digital assistant to be acted upon by one or more digital assistants located outside of the audible range of the spoken voice command.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
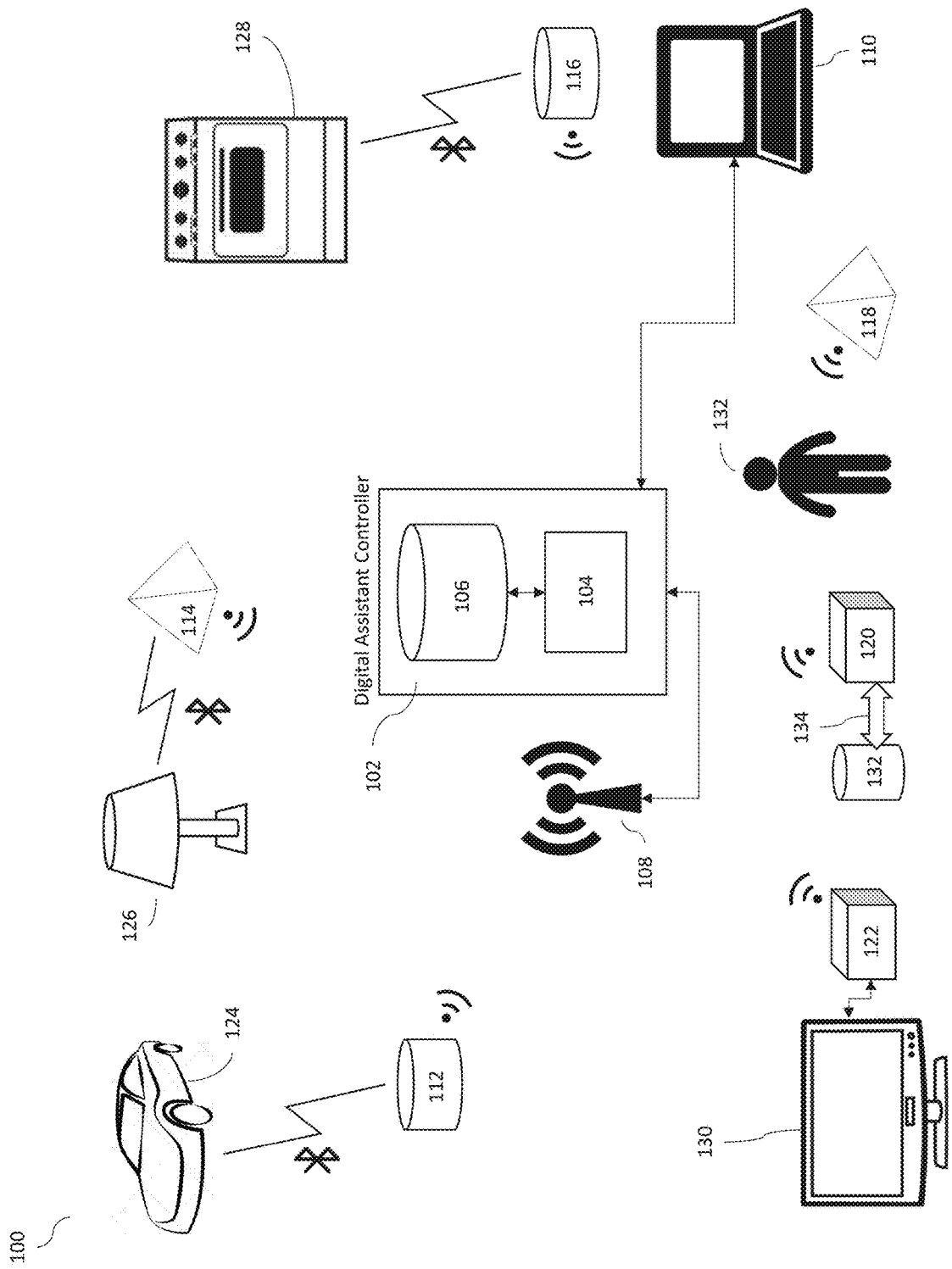
FIG. 1 is a functional diagram of a first preferred embodiment of a digital assistant management system.

FIG. 1 is a functional diagram of a preferred embodiment for a digital assistant management system. As shown, the system 100 includes DAC 102 which serves as the *nexus* for the system. Controller 100 includes processor 104, and memory 106, wireless interface 108, and graphical user interface 110. This controller may be implemented via a general-purpose personal computer, a dedicated appliance (such as a set-top box or other consumer premises equipment) that are co-located with the digital assistants, or via an off-site device connected to the wireless interface via a private or public network. Controller 102 is shown to be wirelessly connected to six digital assistants (112-122), each of which is programmed to respond to a specific activation phrase. Digital assistants 112 and 116 respond to activation phrase A; digital assistants 114 and 118 to activation phrase B, and digital assistants 120 and 112 to activation phrase C.

In addition, particular digital assistants are adapted to interface with and control specific devices or systems. Digital assistant 112 is adapted to interface with and issue commands to automobile 124 via a Bluetooth® connection; digital assistant 114 is adapted to interface with and issue commands to lighting system 126 via a Bluetooth connection; digital assistant 116 is adapted to interface with and issue commands to oven 128 via a Bluetooth connection; digital assistant 120 is adapted to access a remote service/database 132 via Internet connection 134; and digital assistant 122 is integrated into television 130 and adapted to interface and issue commands to that device.

Memory 106 stores information on each of the digital assistants, including a digital assistant identifier, the particular activation phrase each controller responds to and the specific command and control capabilities of each digital assistant. Table A is a representation of such stored information for the system depicted in FIG. 1:

TABLE A

| Digital Assistant Identifier | Activation Phrase | Device-Specific Command & Control Capability |
|---|---|---|
| 112 | A | automobile |
| 114 | B | lighting |
| 116 | A | oven |
| 118 | B | none |
| 120 | C | database access |
| 122 | C | television |

The information stored in memory 106 can be acquired by DAC 102 via the wireless connection with each digital assistant, or such information can be entered via graphical user interface 110. Graphical user interface 110 can be a dedicated interface appliance, a personal computer, or a smartphone, and be connected to the DAC via a wired or wireless connection.

Figure 2:
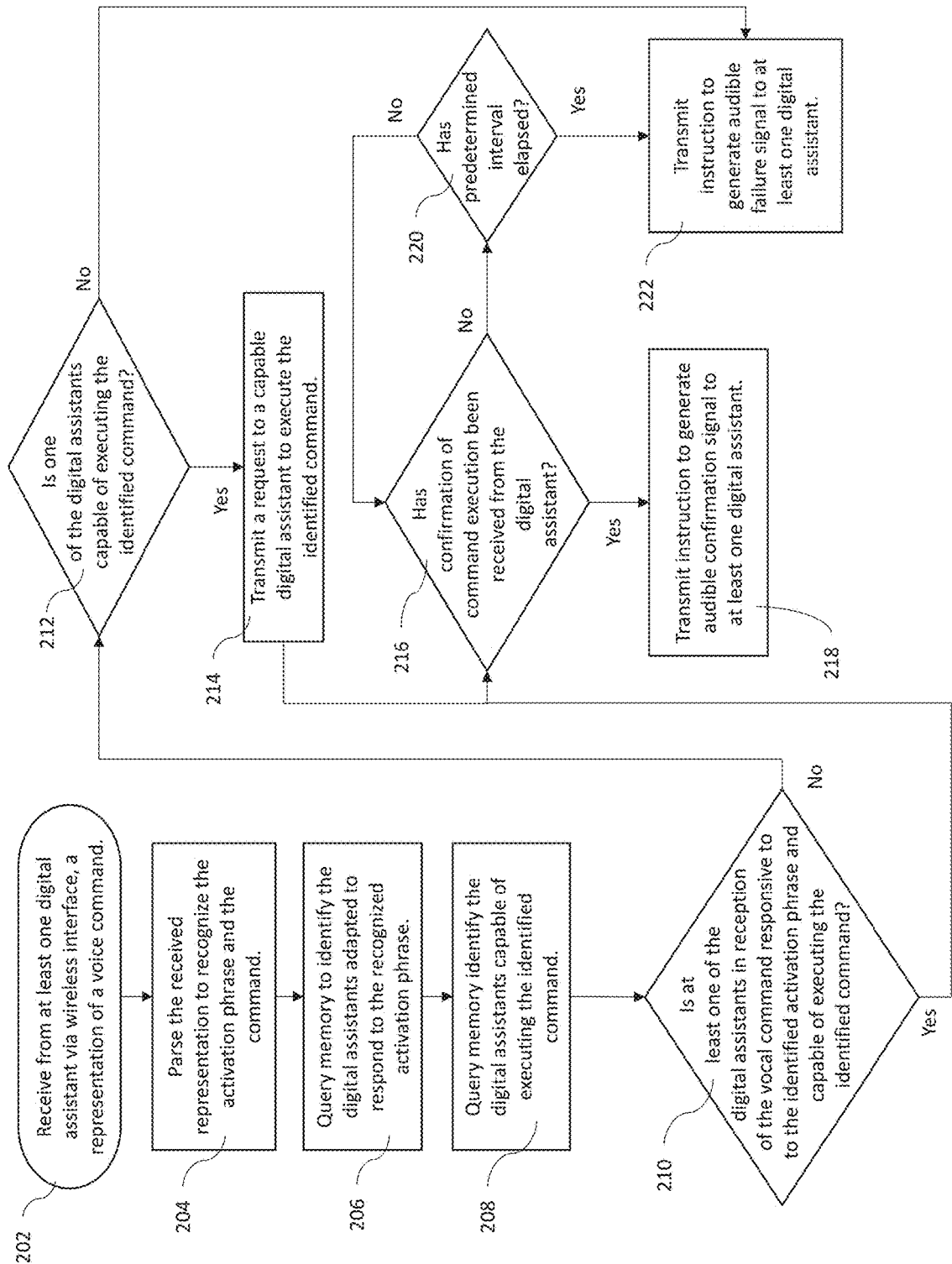
FIG. 2 is a is a flow diagram of operational steps executed within the system of FIG. 1.

Upon the issuance of a voice command by a user of system 100, the command is received via one or more microphones within the digital assistants, assuming the particular digital assistants are within audible range of the user speaking the command. In this example, a command to start automobile 124, prefaced by activation phrase A, is issued by user 132 within audible range of digital assistants 118 and 120. As shown in Table A, neither digital controller 118 or 120 are adapted to be responsive to activation phrase A. Upon receiving the vocal command spoken by user 132, digital assistants 118 and 120 transmit a representation of the received audio to DAC 102 (step 202 of FIG. 2). As shown in FIG. 2, processor 104 analyzes the received audio to parse and recognize the activation phrase (A) and the command (start automobile) (step 204). Such parsing and recognition are well known in the art, and commonly utilized within present digital assistant technologies.

Upon recognition of the activation phrase, processor 102 queries memory 106 to identify the digital assistants adapted to respond to activation phrase A (step 206). As shown in FIG. 1 and Table A, digital assistants 112 and 116 are so adapted. Processor 104 then queries memory 106 to determine identify any digital assistants capable of executing the command start automobile (step 208). Processor 104 then determines if at least one of the digital assistants that received the vocal command is both responsive to the recognized activation phrase and capable of executing the requested command (step 210). As shown in Table A, neither of the digital assistants that received the vocal command (118 and 120) are adapted to respond to activation phrase A, nor are they capable of executing an automobile-related command. The processor then determines if any of the digital assistants are capable of executing the start automobile command (step 212). As shown in FIG. 1 and Table A, digital assistant 112 is properly adapted to respond to a start automobile command. Note that digital assistant 112 is not within audible range of user 132 (only digital assistants 120 and 118 are located in the vicinity of user 132 and capable of detecting spoken commands issued by user 132). Upon making the determination that digital assistant 112 can carry out the requested command, processor 104 transmits a start automobile command request to digital assistant 112 via wireless interface 108 (step 214). The wireless interface could be any local wireless system, such as a Wi-Fi system based on the IEEE 802.11 standard, and the connection between wireless interface and DAC 102 can be either wired or wireless. The command request, upon being received by digital assistant 112, has the same effect as the audible reception of a voice command, prefaced by activation phrase A, to start automobile. Digital assistant 112 responds by transmitting a start command to automobile 124 via Bluetooth, and communication confirmation of such to DAC 102.

Upon receipt of confirmation that digital assistant 112 has successfully executed the start automobile (step 216), DAC 102 causes audible confirmation to be communicated to user 132 (step 218). As previously discussed, the start automobile voice command was received by both digital assistant 118 and 120. DAC 102 will transmit an instruction to one or both of these receiving digital assistants to cause the generation of an audible confirmation signal or announcement (step 214). If, however, DAC 102 fails to receive confirmation that digital assistant 112 has successfully executed the requested command within a predetermined time interval (steps 216 and 220), the DAC will cause an audible failure signal to be communicated to user 132. DAC 102 will transmit an instruction to one or both of these receiving digital assistants to generate of an audible failure signal or announcement (step 222).

DAC 102 may also be programmed to analyze the representations of the voice commands received by digital assistants 118 and 120 so as to make a determination as which of these appliances was in closest proximity to user 132 at the time the start automobile command was spoken. This determination can made as a function of one or more indicia of proximity, such as audio volume, quality, comparative background noise level, etc. Such audio processing is well known and will not be discussed in detail. Upon making a determination that user 132 was in closer proximity to a particular one of digital assistants 118 and 120, processor 104 could be adapted to instruct only that closest digital assistant to generate an audible confirmation/failure signal or announcement.

Figure 3:
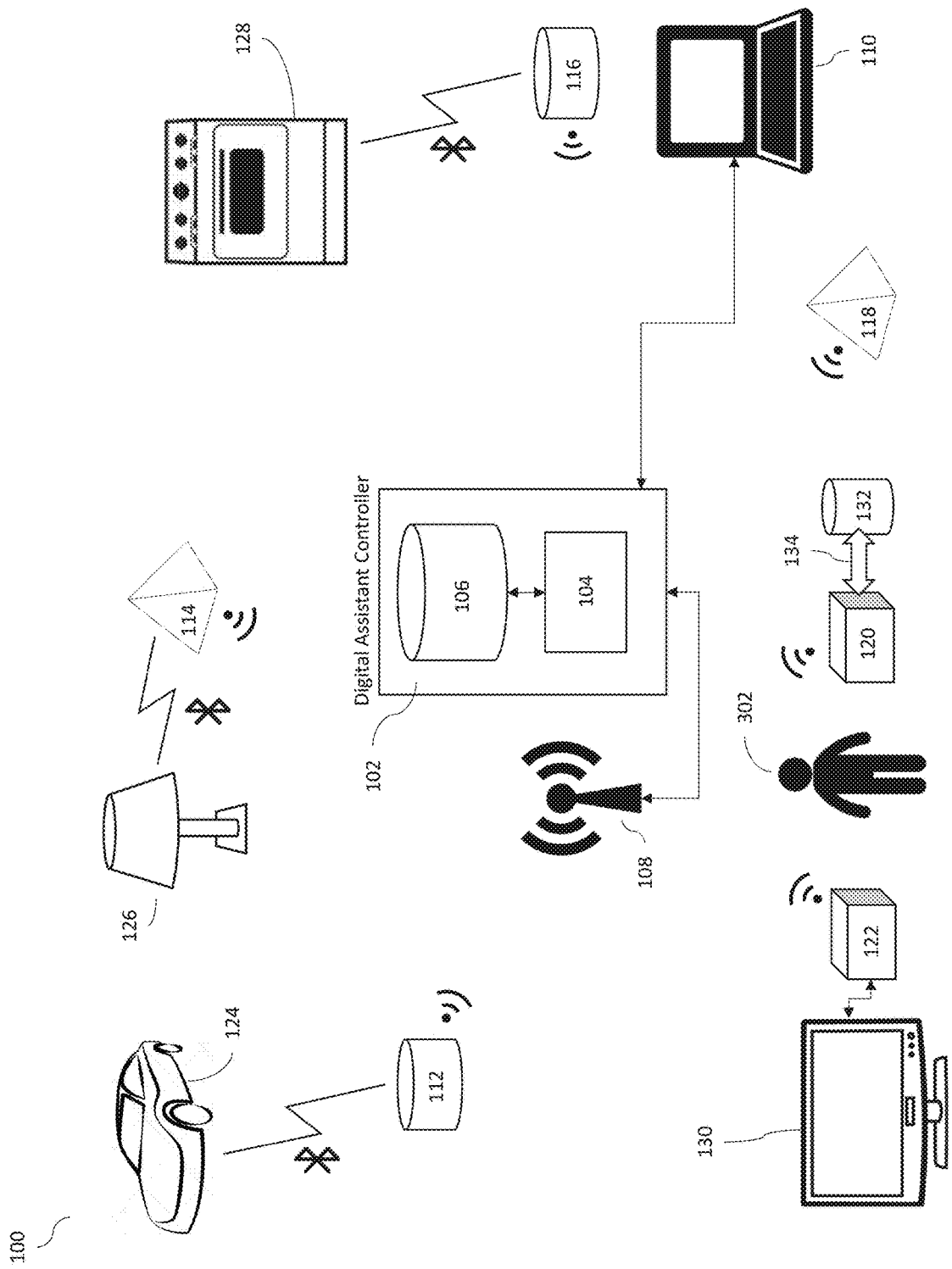
FIG. 3 is a functional diagram of an alternate depiction of the digital assistant management system of FIG. 1.

An alternate scenario of operation for system 100 is depicted in FIG. 3. A command to lower the volume of television 130, prefaced by activation phrase C, is issued by user 302 within audible range of digital assistants 120 and 122. As shown in Table A, both of these controllers are adapted to be responsive to activation phrase C. Upon receiving the vocal command spoken by user 132, digital assistants 120 and 122 transmit a representation of the received audio to DAC 102 (step 202 of FIG. 2). As shown in FIG. 2, processor 104 analyzes the received audio to parse and recognize the activation phrase (A) and the command (start automobile) (step 204).

Upon recognition of the activation phrase, processor 102 queries memory 106 to identify the digital assistants adapted to respond to activation phrase A (step 204). Processor 104 then queries memory 106 to determine identify any digital assistants capable of executing the lower volume command upon television 130 (step 208). Processor 104 then determines if at least one of the digital assistants that received the vocal command is both responsive to the recognized activation phrase and capable of executing the requested command (step 210). As shown in Table A, digital assistant 120 is so adapted.

Upon receipt of confirmation that digital assistant 120 has successfully executed the lower volume command upon television 130 (step 216), DAC 102 will transmit an instruction to digital assistant 120 to cause the generation of an audible confirmation signal or announcement (step 214). If, however, DAC 102 fails to receive confirmation that digital assistant 120 has successfully executed the requested command within a predetermined time interval (steps 216 and 220), the DAC will cause an audible failure signal to be communicated to user 302. DAC 102 will transmit an instruction to digital assistant 120 to generate of an audible failure signal or announcement (step 222).

Figure 4:
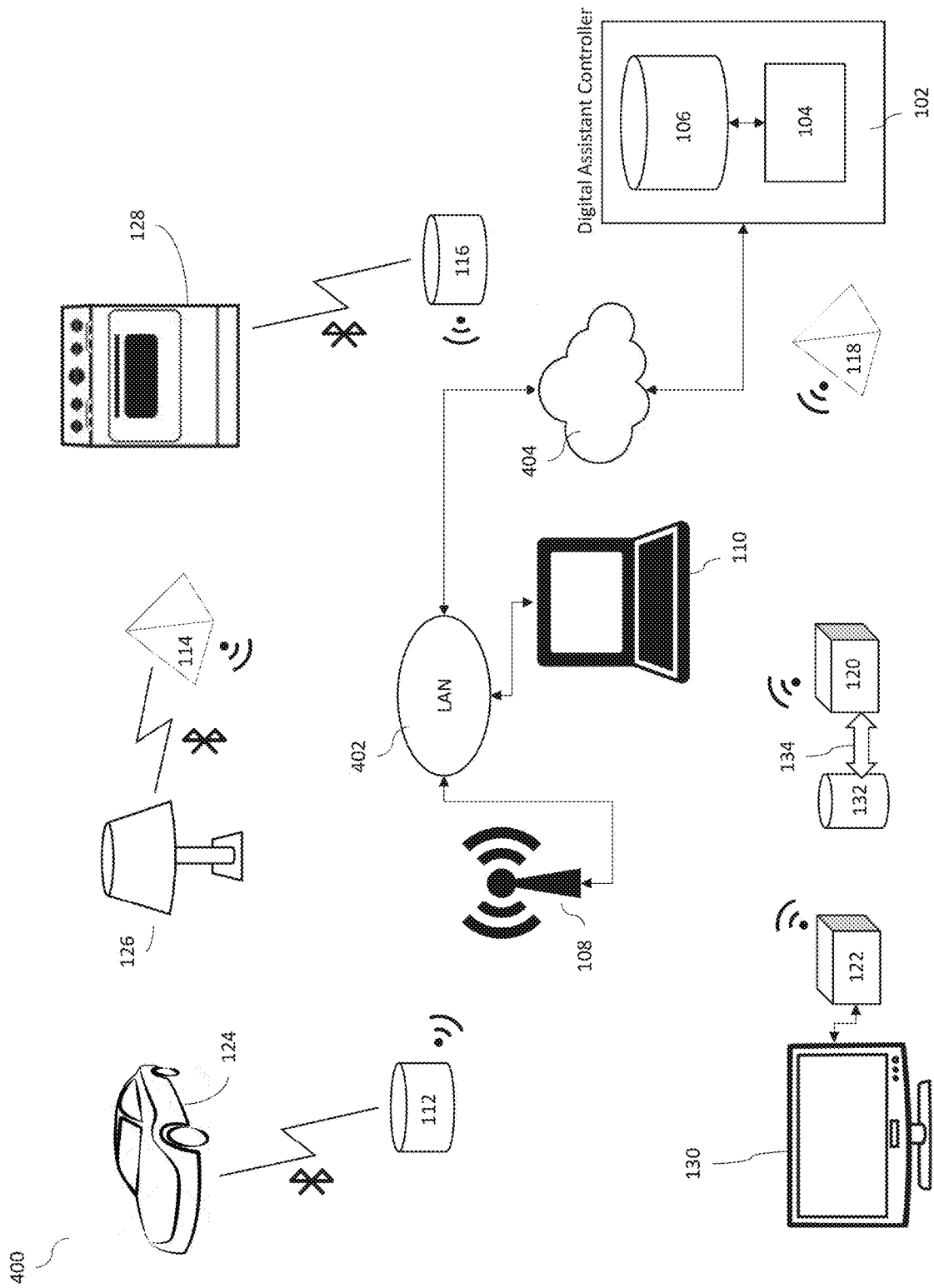
FIG. 4 is a functional diagram of an alternate preferred embodiment of a digital assistant management system.
Figure 5:
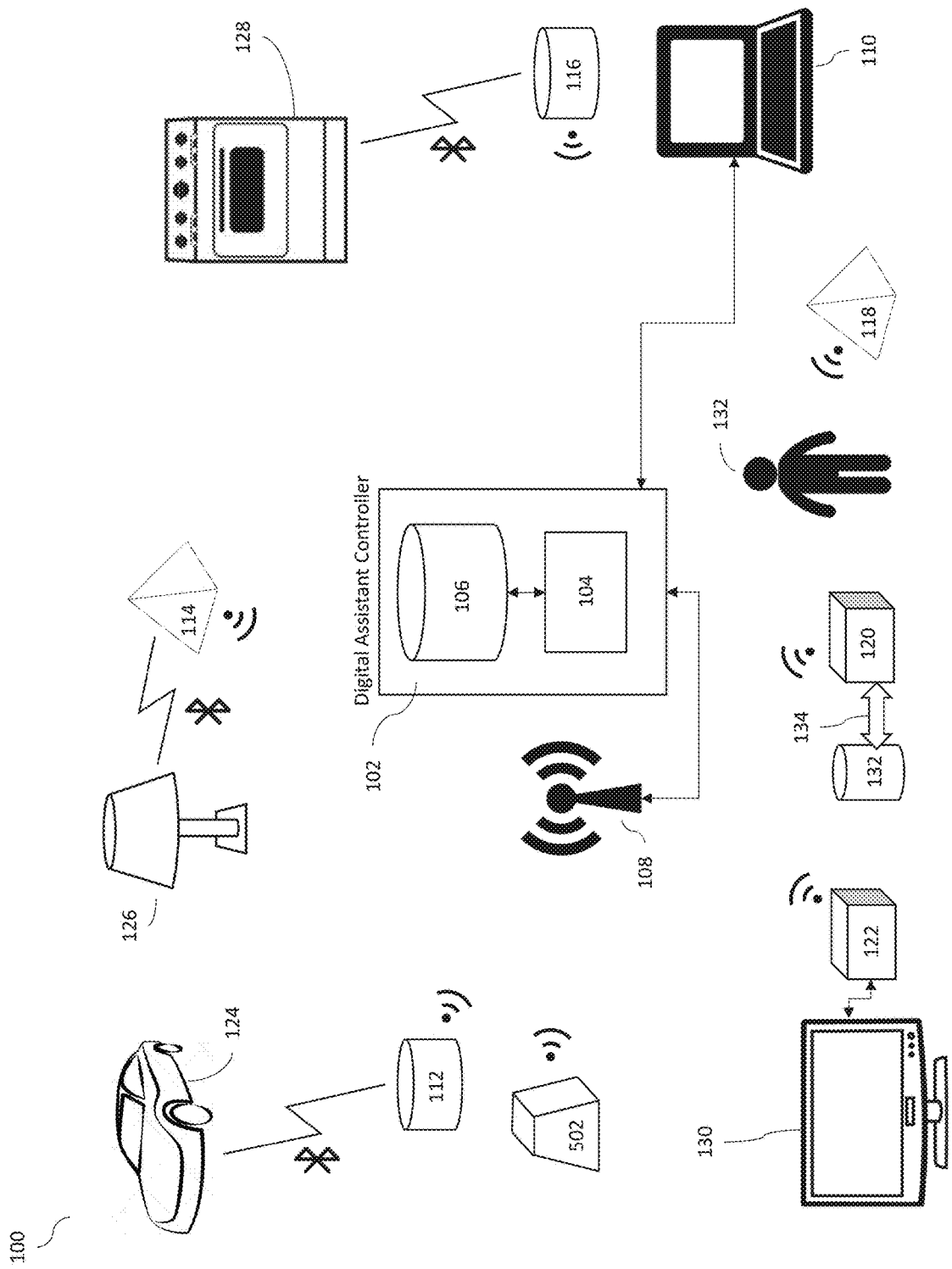
FIG. 5 is a functional diagram of an alternate embodiment of the digital assistant management system of FIG. 1.
Figure 6:
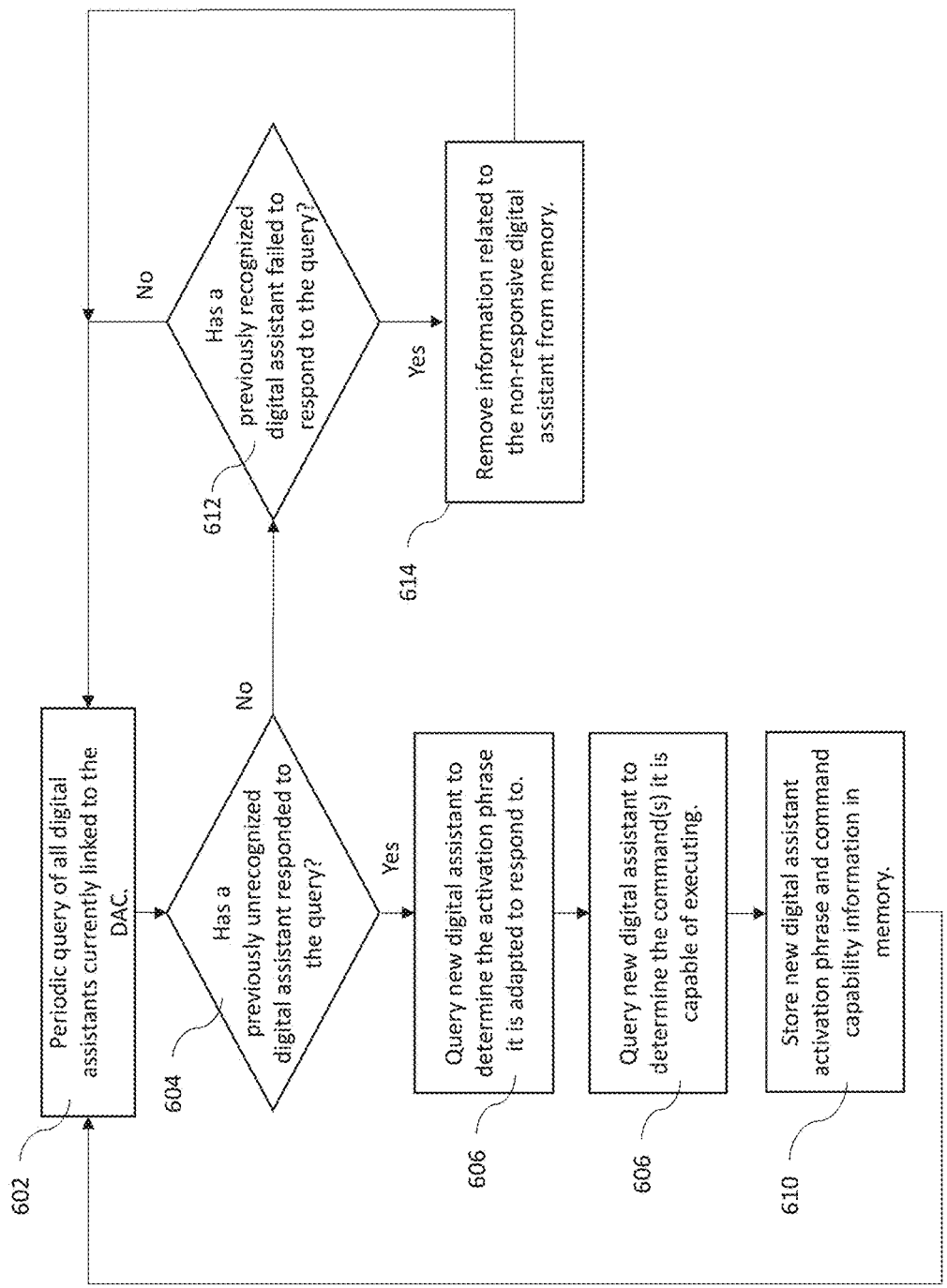
FIG. 6 is a flow diagram of operational steps executed within the system of FIG. 5.

FIG. 4 depicts an alternate embodiment of a digital assistant management system in accordance with this invention. As shown, system 400 includes many of the same components as system 100, and the operation of system 400 follows the same process flow depicted in FIG. 2. However, unlike system 100, wireless interface 108 and graphical user interface 110 are connected (either by wire or wirelessly) to local area network ("LAN") 402. LAN 402 is then connected to DAC 102 via network 404. Network 404 can be any suitable public or private network, including the Internet. This arrangement enables DAC 102 to be remotely located from the premises in which the user and the digital assistants are located. Implementing DAC 102 remotely from the user/digital assistants would include the scenario where the functionality of DAC 102 is provided as a cloud-based service. The ability to remotely process, manage and respond to vocal commands provides an added degree of flexibility to the system. The processing and storage associated with the digital assistant management system do not have to be supported by a stand-alone appliance at user premises, nor embedded within another appliance such as a set-top box. The functionality can be fully supported from a remote location without the need for the installation of additional premises equipment, or the augmentation or re-programming of existing premises equipment. The invention also provides for the automatic updating of the digital assistant controller when new, previously unrecognized digital assistants are added to the system. As shown in FIGS. 5 and 6, digital assistant 502 is introduced into system 100, and connected to DAC 102 (via a Bluetooth connection). Note that digital assistant 502 could have been connected to DAC 102 via a LAN, a wireless connection other than Bluetooth, or via some other hardwired means. DAC 102 performs a periodic query to ascertain if any previously unrecognized digital assistants have connected to the system (steps 602 and 604). DAC 102 then queries any such previously unrecognized digital assistants to determine the activation phrase they are responsive to (step 606) and the particular command capabilities of each digital assistant (step 608). DAC 102 then updates the information stored in memory 106 to include digital assistant 502 characteristics (step 610. Table B is a representation of such stored information for the system depicted in FIG. 5:

TABLE B

| Digital Assistant Identifier | Activation Phrase | Device-Specific Command & Control Capability |
|---|---|---|
| 112 | A | automobile |
| 114 | B | lighting |
| 116 | A | oven |
| 118 | B | none |
| 120 | C | database access |
| 122 | C | television |
| 502 | D | front door |

As shown, digital assistant 502 responds to activation phrase D and is capable of issuing commands that control the locking/unlocking of the front door.

In addition, the periodic query function of DAC 102 also determines if the capabilities of a connected digital assistant have changes since the last query was performed. For example, if a periodic query of the digital assistants determined that digital assistant 118, which had previously be categorized as having no device-specific command and control capabilities associated with it (see Tables A and B), was now capable of controlling an air conditioning unit, DAC 102 would update the information stored in memory 106 to reflect this ability, as shown in Table C below:

TABLE C

| Digital Assistant Identifier | Activation Phrase | Device-Specific Command & Control Capability |
|---|---|---|
| 112 | A | automobile |
| 114 | B | lighting |
| 116 | A | oven |
| 118 | B | air conditioner |
| 120 | C | database access |
| 122 | C | television |
| 502 | D | front door |

The acquisition by digital assistant 118 of the ability to control the air conditioning unit could have been a consequence of the restoration of the link connecting the digital assistant to the air conditioner (for example, Bluetooth transponder was switched on, or the air conditioner itself being power on, or an update to the software of the digital assistant, etc.

DAC 102 also functions to update memory 106 if a digital assistant becomes inoperative, or is intentionally removed or deactivated. As shown in step 602 of FIG. 6, DAC 102 is programmed to periodically query each of the linked digital assistants. If no previously unrecognized digital assistants are detected, the DAC then determines if a previously recognized digital assistant has failed to respond to the query (steps 604 and 612). Memory 106 is then updated to reflect the absence of the non-responsive digital assistant(s) (step 614). This query process permits the system to maintain an up-to-date listing of the available digital assistants and their respective capabilities.

Although the invention herein has been described with reference to particular embodiments, it is to be understood that these embodiments are merely illustrative of the principles and applications of the present invention. For example, the digital assistants can be connected to a DAC or LAN via a wired network, such as Ethernet networking technologies. In addition, various functional aspects of the invention could be implemented via physical arrangements that might have varying degrees of integration. The entirety of the disclosed invention could be implemented within a monolithic system, or disparate discrete components without departing from the spirit and scope of the present invention as defined by the appended claims.

The invention claimed is:
1. A digital assistant management system comprising:
a plurality of digital assistants connected to a network, wherein each digital assistant of the plurality of digital assistants (i) is associated with a respective device, (ii) is configured to respond to a specific activation phrase and (iii) is configured to interface with and control a specific device or system;
a controller, comprising at least one processor and at least one memory, wherein:

the memory stores information on (i) each digital assistant of the plurality of digital assistants, (ii) the specific activation phrase to which each respective digital assistant responds and (ii) command execution capabilities associated with the at least one each digital assistant; and the at least one processor is configured to:
receive from at least one digital assistant a representation of a vocal command spoken by a user, wherein the at least one digital assistant is within audible range of the user speaking the command;
recognize an activation phrase and a command within the received representation;
upon recognition of the activation phrase, determine each digital assistant of the plurality of digital assistants that is configured to respond to the recognized activation phrase and execute the identified command based on at least the information stored in the memory; and
transmit an instruction to execute the identified command to each digital assistant identified as configured to execute the identified command.

2. The system of claim 1 wherein the controller is further configured to:
periodically query the plurality of digital assistants to detect at least one digital assistant connected to the network for which the memory does not store associated information;
determine, based at least in part upon information obtained during a periodic query that, new command execution capabilities associated with the at least one detected digital assistant; and
store information indicative of the newly determined command execution capabilities associated with the at least one detected digital assistant in the memory.

3. The system of claim 1 wherein the controller is further configured to:
periodically query the plurality of digital assistants to detect when at least one digital assistant, for which the memory stores associated information on command execution capabilities, is disconnected from the network;
remove information on the command execution capabilities associated with the at least one disconnected digital assistant from the memory.

4. The system of claim 1 wherein the controller is further configured to instruct the at least one digital assistant from which the representation of a vocal command was received to generate an audible signal indicative of command failure in response to not receiving confirmation from the at least one digital assistant identified as configured to execute the identified command was executed within a predetermined time after the reception of the representation of a vocal command spoken by a user.

5. The system of claim 1 wherein at least one of the plurality of digital assistants is connected to the controller via a wireless interface.

6. The system of claim 1 wherein the at least one digital assistant identified as configured to execute the identified command is located beyond the audible range of the vocal command spoken by the user.

7. The system of claim 1 wherein at least one of the plurality of digital assistants is configured to execute commands to control at least one or more devices comprising an automobile, a household appliance, a television; or a lighting system.

8. The system of claim 1 further comprising a graphical user interface.

9. The system of claim 1 wherein at least one of the plurality of digital assistants is configured to execute commands to access at least one or more of a service or a database via a network connection.

10. The system of claim 9 wherein at the network comprises the Internet.

11. The system of claim 1 wherein at least one of the plurality of digital assistants interface with the controller via a network.

12. The system of claim 11 wherein the network comprises the Internet.

13. The system of claim 1 wherein the controller is further configured to:
receive confirmation from at least one digital assistant of each digital assistant configured to execute the identified command that the identified command has been executed.

14. The system of claim 13 wherein the controller is further configured to:
instruct the at least one digital assistant from which the representation of a vocal command was received to generate an audible signal indicative of command execution in response to received confirmation.

15. A method for managing a system comprising:
a plurality of digital assistants connected to a network, wherein each digital assistant of the plurality of digital assistants (i) is associated with a respective device, (ii) is configured to respond to a specific activation phrase and (iii) is configured to interface with and control a specific device or system;
a controller comprising at least one processor and at least one memory;
the method comprising the steps:
storing, in the at least one memory of the controller, information on (i) each digital assistant of the plurality of digital assistants, (ii) the specific activation phrase to which each respective digital assistant responds and (ii) command execution capabilities associated with each digital assistant;
receiving, by the at least one processor of the controller, from at least one digital assistant, a representation of a vocal command spoken by a user, wherein the at least one digital assistant is within audible range of the user speaking the command;
recognizing, by the at least one processor of the controller, an activation phrase and a command within the received representation;
upon recognizing the activation phrase, determining, by the at least one processor of the controller, each digital assistant that is configured to respond to the recognized activation phrase and execute the identified command based on at least information stored in the memory; and
transmitting an instruction to execute the identified command to each digital assistant identified as configured to execute the identified command.

16. The method of claim 15 further comprising the step of instructing, by the at least one processor of the controller, the at least one digital assistant from which the representation of a vocal command was received to generate an audible signal indicative of command failure in response to not receiving confirmation from at least one digital assistant identified as configured to execute the identified command was executed within a predetermined time after the reception of the representation of a vocal command spoken by a user.

17. The method of claim 15 wherein the at least one digital assistant identified as configured to execute the identified command is located beyond the audible range of the vocal command spoken by the user.

18. The method of claim 15 wherein at least one of the plurality of digital assistants is configured to execute commands to control one or more devices comprising an automobile, a household appliance, a television; or a lighting system.

19. The method of claim 15 wherein at least one of the plurality of digital assistants is configured to execute commands to access at least one or more of a service or a database via a network connection.

20. The method of claim 19 wherein at the network comprises the Internet.

21. The method of claim 15 wherein the step of recognizing the activation phrase comprises querying the memory storing the information on the specific activation phrase to which each respective digital assistant responds.

22. The method of claim 15 further comprising the step of receiving, by the at least one processor of the controller, confirmation from at least one digital assistant of each digital assistant configured to execute the identified command that the identified command has been executed.

23. The method of claim 22 further comprising:
   instructing, by the at least one processor of the controller, the at least one digital assistant from which the representation of a vocal command was received to generate an audible signal indicative of command execution in response to the received confirmation.

* * * * *